US 8,856,484 B2

(12) United States Patent
Ben-Tsion et al.

(10) Patent No.: US 8,856,484 B2
(45) Date of Patent: Oct. 7, 2014

(54) MASS STORAGE SYSTEM AND METHODS OF CONTROLLING RESOURCES THEREOF

(75) Inventors: Ido Ben-Tsion, Ramat Gan (IL); Efraim Zeidner, Haifa (IL)

(73) Assignee: Infinidat Ltd., Herzliya (IL)

( * ) Notice: Subject to any disclaimer, the term of this patent is extended or adjusted under 35 U.S.C. 154(b) by 92 days.

(21) Appl. No.: 13/584,839

(22) Filed: Aug. 14, 2012

(65) Prior Publication Data

US 2014/0052953 A1 Feb. 20, 2014

(51) Int. Cl.
*G06F 12/06* (2006.01)
*G06F 3/06* (2006.01)

(52) U.S. Cl.
USPC .................. 711/171; 711/172; 711/E21.084

(58) Field of Classification Search
None
See application file for complete search history.

(56) References Cited

U.S. PATENT DOCUMENTS

| | | | | |
|---|---|---|---|---|
| 6,298,425 B1 * | 10/2001 | Whitaker et al. | ............. | 711/162 |
| 7,676,510 B1 * | 3/2010 | Karinta | ........................ | 711/162 |
| 7,899,996 B1 * | 3/2011 | Levin-Michael | ............. | 711/137 |
| 7,945,724 B1 * | 5/2011 | Smith et al. | ................... | 711/103 |
| 8,046,551 B1 * | 10/2011 | Sahin | ........................... | 711/162 |
| 8,230,153 B2 * | 7/2012 | El Zur | ................................ | 711/4 |
| 2002/0103969 A1 * | 8/2002 | Koizumi et al. | ............. | 711/114 |
| 2003/0009482 A1 * | 1/2003 | Benerjee et al. | ............. | 707/200 |
| 2003/0033308 A1 * | 2/2003 | Patel et al. | ...................... | 707/10 |
| 2003/0120863 A1 * | 6/2003 | Lee et al. | ........................ | 711/114 |
| 2003/0217240 A1 * | 11/2003 | Satomi et al. | ................. | 711/161 |
| 2004/0024798 A1 * | 2/2004 | Chauvel | ........................ | 707/206 |
| 2005/0108479 A1 * | 5/2005 | Lakshmanamurthy et al. | ............................. | 711/125 |
| 2005/0228950 A1 * | 10/2005 | Karr | .............................. | 711/114 |
| 2006/0116985 A1 * | 6/2006 | Thind et al. | ....................... | 707/3 |
| 2006/0206498 A1 * | 9/2006 | Fujiwara | ........................ | 707/100 |
| 2007/0067583 A1 * | 3/2007 | Zohar et al. | ................... | 711/162 |
| 2007/0180239 A1 * | 8/2007 | Fujibayashi et al. | .......... | 713/165 |
| 2007/0185938 A1 * | 8/2007 | Prahlad et al. | ................ | 707/204 |
| 2007/0186068 A1 * | 8/2007 | Agrawal | ........................ | 711/162 |
| 2007/0226438 A1 * | 9/2007 | Erofeev | ........................ | 711/162 |
| 2008/0049354 A1 * | 2/2008 | Nitta | ............................. | 360/72.1 |
| 2009/0157770 A1 * | 6/2009 | Havewala et al. | ............. | 707/203 |
| 2010/0058015 A1 * | 3/2010 | Tokoro | ........................... | 711/162 |
| 2010/0082920 A1 * | 4/2010 | Larson | ........................... | 711/162 |
| 2010/0169595 A1 * | 7/2010 | Bryant-Rich | ................ | 711/162 |
| 2010/0185829 A1 * | 7/2010 | Dudgeon et al. | ............. | 711/171 |
| 2010/0262795 A1 * | 10/2010 | Hetzler et al. | ................ | 711/162 |
| 2011/0072224 A1 * | 3/2011 | Popovski et al. | ............. | 711/162 |
| 2011/0302477 A1 * | 12/2011 | Goss et al. | ..................... | 711/103 |
| 2012/0036164 A1 * | 2/2012 | Jahan et al. | ................... | 707/803 |
| 2012/0191667 A1 * | 7/2012 | Kopylovitz et al. | .......... | 707/692 |
| 2012/0246392 A1 * | 9/2012 | Cheon | ........................... | 711/103 |
| 2012/0266162 A1 * | 10/2012 | Baron | ............................. | 718/1 |
| 2012/0278564 A1 * | 11/2012 | Goss et al. | ..................... | 711/155 |

(Continued)

OTHER PUBLICATIONS

Blunden et al. "Storage Networking Virtualization: What'it all about?" IBM International Technical Support Organization Redbooks, Dec. 2000.*

*Primary Examiner* — Matthew Bradley
*Assistant Examiner* — Daniel Bernard
(74) *Attorney, Agent, or Firm* — Oren Reches

(57) ABSTRACT

A storage system and a method for managing a memory capable of storing metadata related to logical volume sets, are disclosed. A memory quota is assigned to a metadata related to a logical volume set. The size of a memory currently consumed by the metadata is monitored. Upon exceeding a threshold by the size of the monitored memory, at least one restraining action related to memory consumption by the metadata is applied.

20 Claims, 3 Drawing Sheets

(56) References Cited

U.S. PATENT DOCUMENTS

| | | | |
|---|---|---|---|
| 2013/0024722 A1* | 1/2013 | Kotagiri et al. | 714/6.1 |
| 2013/0067426 A1* | 3/2013 | Fox et al. | 717/101 |
| 2013/0173961 A1* | 7/2013 | Moser | 714/32 |
| 2013/0262800 A1* | 10/2013 | Goodman et al. | 711/162 |

* cited by examiner

300

MASS STORAGE SYSTEM AND METHODS OF CONTROLLING RESOURCES THEREOF

TECHNICAL FIELD

The presently disclosed subject matter relates to resource controlling in a virtualized mass storage system and, more particularly, to monitoring and restricting memory consumption in a virtualized mass storage system.

BACKGROUND

A virtualized storage system is operable to handle a virtual representation of a physical storage space and to facilitate necessary mapping between the physical storage space and its virtual representation. The virtual representation consists of at least one virtual layer, operative to represent logical units, e.g. logical volumes, available to clients.

Implementing virtualization layers involves employing data structures for mapping virtual address ranges, within the virtual address space of logical volumes, into the physical storage space. The virtual address space of the storage system can be substantially larger than the physical storage space.

A virtual storage space is allocated for a logical volume upon volume creation. However, physical storage allocation is not necessarily required at the time of the volume creation. Physical address blocks can be allocated for a logical volume, in the physical storage space, only upon actual writing to the volume and only then the allocated physical address blocks are mapped to virtual address blocks within the virtual storage space of the volume. Since the storage resources are not necessarily allocated for the logical volume upfront, a storage system is required to monitor and possibly restrict the storage resources consumed by the logical volumes, so as to avoid situations of resource starvation caused due to unreasonably usage by a minority of volumes.

A mass storage system may be used as a data hosting service for multiple customers, all sharing the same storage resources. One of the central challenges in a shared environment is to manage resources such that applications and customers are isolated from each other and their performance can be guaranteed as in a dedicated environment. To avoid unjust resource allocation in the shared environment of a mass storage system, resources such as cache and storage space have to be managed. Especially, techniques for monitoring storage capacity consumed by thin provisioning volumes have been implemented by storage systems to avoid over allocation of the shared storage area.

SUMMARY

In addition to storage consumption management provided by known techniques, there is a need in managing memory related to stored metadata.

Thus, in accordance with certain aspects of the currently presented subject matter, there is provided a method of managing a memory of a storage system. The memory being capable of storing metadata related to logical volumes configured in the storage system, the method includes: monitoring a size of a memory currently consumed by a metadata related to a logical volume set, thus giving rise to a monitored memory size; upon exceeding, by the monitored memory size, a threshold related to a memory quota assigned to the metadata, applying at least one restraining action related to a memory consumption by the metadata.

Optionally, the method may be provided for all logical volume sets configured in the storage system.

Optionally, the metadata includes a data-structure capable of mapping between virtual storage addresses and physical storage addresses allocated to the logical volume set.

The logical volume set may include a logical volume and at least one snapshot related to the logical volume or a plurality of logical volumes associated with a specific owner entity.

In accordance with certain aspects of the presently disclosed subject matter, a value of the memory quota is configured in accordance with a classification of said logical volume set.

In accordance with further aspects and, optionally, in combination with other aspects of the presently disclosed subject matter, the at least one restraining action is selected among predefined restraining actions in accordance with a classification of the logical volume set.

The classification may be one or more of: a type of the logical volume set; a size of the logical volume set; a class of service assigned to the logical volume set; and a quality of service guaranteed to an owner entity of the logical volume set.

In accordance with further aspects and, optionally, in combination with other aspects of the presently disclosed subject matter, one or more thresholds related to the memory quota are characterized by respective severity levels, and wherein the at least one restraining action is selected among predefined restraining actions in accordance with a severity level of the threshold being exceeded.

In accordance with certain aspects of the presently disclosed subject matter, the at least one restraining action may be selected from the following predefined restraining actions: actions related to restriction of services consuming memory associated with the metadata; and actions related to reducing the size of memory consumed by the metadata.

In accordance with further aspects and, optionally, in combination with other aspects of the presently disclosed subject matter, the at least one restraining action may be an action related to restriction of services consuming the memory associated the metadata, selected from: disabling creation of new snapshots related to the logical volume set; disabling data writings to writable snapshots related to the logical volume set; and disabling data writings to at least one volume comprised in the logical volume set, in case the at least one logical volume is associated with at least one snapshot.

In accordance with further aspects and, optionally, in combination with other aspects of the presently disclosed subject matter, the at least one restraining action is an action related to reducing the size of consumed memory related to the metadata, selected from: deleting one or more snapshots associated with the logical volume set; enabling execution of a defragmentation process that enables reducing the size of the memory related to the metadata; compressing cold areas comprised in the memory related to the metadata; and paging out cold areas included in the memory related to the metadata.

In accordance with certain aspects of the currently presented subject matter, there is provided a method of managing a memory of a storage system. The memory being capable of storing metadata related to logical volume configured in the storage system, the method includes: monitoring a size of a memory currently consumed by a metadata related to a logical volume set; thus giving rise to a monitored memory size; upon exceeding by the monitored memory size a threshold related to a memory quota assigned to the metadata, restricting services related to snapshots associated with the logical volume set.

In accordance with certain aspects of the currently presented subject matter, there is provided a storage system that includes: a metadata memory for storing a metadata related to a logical volume set configured in the storage system; a memory monitor, operatively coupled to the metadata memory, configured to monitor a size of a memory currently consumed by the metadata, thus giving rise to a monitored group memory size; and a volume manager, operatively coupled to the metadata memory and the memory monitor, configured to apply at least one restraining action related to a memory consumption by a metadata related to the logical volume set, upon exceeding, by the monitored group memory size, a threshold related to a memory quota assigned to the metadata.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the disclosed subject matter. However, it will be understood by those skilled in the art that the presently disclosed subject matter can be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "assigning", "monitoring", "applying", "restricting", "reducing", "disabling", "enabling", "executing", "deleting" or the like, refer to the action and/or processes of a computer that manipulate and/or transform data into other data, said data represented as physical quantities, e.g. such as electronic quantities, and/or said data representing the physical objects. The term "computer" as used herein should be expansively construed to cover any kind of electronic device with data processing capabilities.

The operations in accordance with the teachings herein can be performed by a computer specially constructed for the desired purposes or by a general-purpose computer specially configured for the desired purpose by a computer program stored in a computer readable storage medium.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
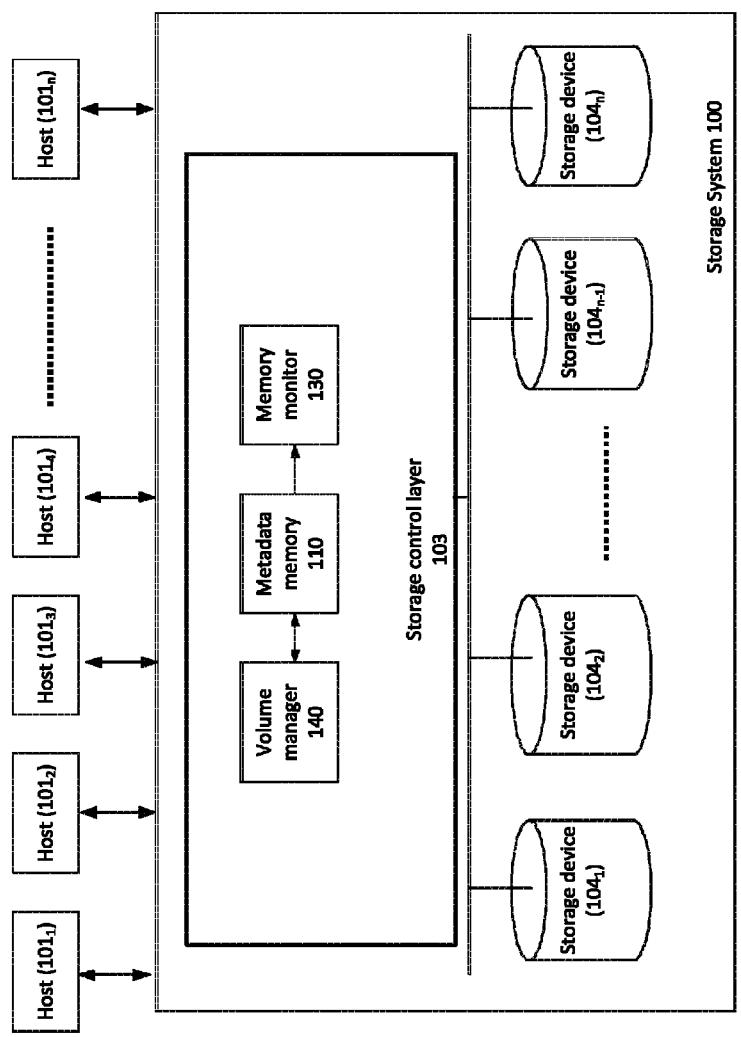
FIG. 1 is a functional block diagram of an embodiment of a virtualized mass storage system in accordance with presently disclosed subject matter.

Attention is drawn to FIG. 1, illustrating a functional diagram of an exemplary embodiment of a virtualized storage system 100, according to the presently disclosed subject matter. FIG. 1 depicts one or more host computers $101_{1-n}$ illustrated as sharing common storage means provided by virtualized storage system 100. A host ($101_{1-n}$) can be for example a workstation, an external server, a group of servers, a port in server, a laptop or personal computer, etc.

Storage system 100 includes a storage control layer 103 with one or more appropriate storage control devices operatively coupled to the plurality of host computers $101_{1-n}$ and to a plurality of data storage devices $104_{1-n}$ constituting a physical storage space optionally distributed over one or more storage nodes. Storage control layer 103 is operable to perform control operations including input/output (I/O) operations between hosts $101_{1-n}$ and data storage devices $104_{1-n}$. Connection between host computers $101_{1-n}$ and storage system 100 can be a direct connection and/or it can be established over a communication network. Data storage devices $104_{1-n}$ are adapted for storing a plurality of data units. Control layer 103 comprises one or more processors configured, inter alia, to manage and control relevant components, resources and operations, and to perform tasks in response to instructions.

Storage control layer 103 is further operable to handle a virtual representation of the physical storage space and to facilitate necessary mapping between the physical storage space and its virtual representation (i.e. a virtual address space). Control layer 103 is configured to create and manage at least one virtualization layer interfacing between elements of the computer systems (host computers, etc.) external to the storage system and the physical storage space. The virtualization functions can be provided in hardware, software, firmware or any suitable combination thereof.

Optionally, the functions of control layer 103 may be fully or partly integrated with one or more host computers and/or storage devices and/or with one or more communication devices enabling communication between the hosts and the storage devices.

The physical storage space can comprise any appropriate permanent storage medium and may include, by way of non-limiting example, one or more disk units (DUs), also called "disk enclosures", comprising several disk drives (disks). The physical storage space comprises a plurality of data blocks, each data block may be characterized by a pair ($DD_{id}$, DBA) where $DD_{id}$ is a serial number associated with the disk drive accommodating the data block, and DBA is a logical block number within the respective disk. Storage control layer 103 and storage devices $104_{1-n}$ can communicate with host computers $101_{1-n}$ and within the storage system in accordance with any appropriate storage protocol.

Data stored in the physical storage space, can be logically represented to a client (host) in terms of logical objects within a logical storage space. Depending on the storage protocol, the logical objects may be logical volumes, data files, multimedia files, snapshots and other copies, etc.

The entire address space of the storage system is divided into logical volumes, and each logical volume becomes an addressable device. A logical volume (LV) or logical unit (LU) represents a plurality of data blocks characterized by successive Logical Block Addresses (LBA). Different logical volumes can comprise different numbers of data blocks, which are typically of equal size within a given system (e.g. 512 bytes).

Mass virtualized storage systems use a substantial amount of memory resources, in addition to employing disk storage space. The principal consumers of memory resources are the data cache mechanism and volume metadata, which is typically a memory resident.

Control layer 103 includes a metadata memory 110 for storing metadata required for managing volumes, for example, the metadata of a volume can include address mapping data-structures that include mapping information of logical volumes for associating logical address ranges and physical address ranges. Address mapping data-structures map virtual memory addresses of a volume into physical memory space, or maps address space of higher virtualization layer (i.e. more abstract) to address space of a lower virtualization layer (i.e. closer to the physical storage space). Metadata memory 110 is preferably a volatile memory so as to optimize access to the mapping information, but other memories having high performance can be used, such as a SSD (Solid State Drive) or a battery backup RAM.

For the sake of simplicity of explanation, it is assumed that each volume, along with its snapshots, is assigned with a dedicated mapping data structure, however, other embodiments may include for example, a group of mapping data structures for all versions of the volume (e.g. the volume and its snapshots), or one data structure for all volumes in the system divided into sub-structures, one for each volume family.

The mapping data structure is preferably a dynamic data-structure, such that memory is not allocated for the mapping data structure in advanced, upon volume creation, but rather allocated upon demand.

Generally, the size of the mapping data structure may be proportion to the amount of storage allocated for the volume within the physical storage space, because an optimized mapping data structure does not store information for non-allocated regions of the volume or alternatively, store minimal information for non-allocated regions. For example, ranges in the virtual address space that have not yet been assigned to ranges in the physical memory, refer to null values in the mapping data structure, or do not appear in the mapping data structure at all. Only virtual memory ranges that were written to, have references to physical memory ranges. Such an optimized mapping data structure is particularly implemented for virtual logical volumes, e.g. thin provisioned volumes.

Other factors, other than the amount, of storage allocated for the volume, may influent the size of the mapping data structure (and therefore influent the memory consumed by the mapping data structure), as detailed herein below.

The mapping data structure has multiple entries (or nodes) for respectively mapping multiple segments of memory. Each entry in the mapping data-structure can map one memory fragment (a contiguous virtual address range) to one or more contiguous physical address range(s). Thus, a highly fragmented volume (in terms of logical address fragmentation, but also in terms of physical fragmentation) is associated with a mapping data-structure having an excessive number of entries, which consumes more memory. Note that such a memory consuming mapping data structure, caused by a substantial fragmentation, can be associated with any type of volume provisioning, thick volume provisioning as well as thin volume provisioning. Fragmentation occurs, for example, due to deletion of smaller address ranges that constitute part of contiguous address ranges in the mapping data structure, or upon rewriting data mapped by such smaller address ranges to other physical address ranges. Both operations may split an entry in the mapping data structure into two or more entries.

A snapshot of a volume also consumes memory space of the mapping data-structure, either by using a separate mapping data-structure dedicated for the snapshot, or alternatively, the original volume's mapping data-structure can include information for all the versions, i.e. for all snapshots of the volume.

When implementing e.g. thin provisioned volumes (or any other volume provisioning that does not map all physical address space of the volume upfront), the mapping data-structures grow as the thin volumes grow, since mapping information is added upon writing new data, for associating virtual memory to physical memory allocated by the newly written data. As detailed in the examples above, the mapping data-structures also grow as the volume fragmentation increases and as the number of the volume's snapshot is incremented.

Thus, there is a need to monitor memory utilization, independently from disk storage utilization and to restrict or even reduce the memory consumption upon detecting high levels of memory utilization.

Memory monitor 130 is configured to monitor the utilization of metadata memory 110 by one or more logical volumes, the utilization can be measured, for example, according to the size of mapping structures accommodated in metadata memory 110.

A volume manager 140 that controls all volume operations, is configured to assign memory quotas to logical volumes. A memory quota is a value that defines the upper limit of memory that is allowed for use by a metadata of a logical volume(s).

The memory quota is preferably assigned per logical volume set. A logical volume set herein after is defined as either: (iii) a single volume; (ii) a volume and all its descendants that share part or all the physical blocks of the volume (e.g. snapshots, clones, etc.); (iii) A group of volumes (with or without their corresponding descendants) that are owned by a certain owner entity (e.g. user, application, etc.). Optionally, the volume set includes all the volumes of the user/application and the quota is assigned per user/application. Alternatively, the volume set includes all the volumes of the same class, of the same user/application and the user/application can get a quota per each owned volume set of same specific class. The class of a volume can refer for example to the type of volume provisioning (thick versus thin provisioning); or can be otherwise refer to a class of service (with reference to underlying hardware's quality or management issues) that is assigned to the volumes or a quality of service that is guaranteed to the volume's owner.

The memory quota assigned to a volume set can be proportional to the size of the volume(s) within the set. For example: a set of thick provisioned volume(s) of 2 tera bytes will be assigned with a memory quota that is double than a memory quota assigned to a set of thick provisioned volume(s) of 1 tera bytes. Alternatively or additionally, the memory quota assigned to a volume set can be related to the type of the volume(s) within the set. For example, a set of thin provisioned volume(s) will be assigned with a memory quota that is smaller than a memory quota assigned to a set of thick provisioned volume(s). Alternatively or additionally, the memory quota assigned to a volume set can be related to the class of service assigned of the volume(s) within the set or to the quality of service guaranteed to the set owner. For example, a set that is associated with a "gold" class of service will be assigned with a memory quota that is higher than a memory quota assigned to a set that is associated with a "silver" class of service.

Volume manager 140 is further configured to assign memory consumption thresholds for metadata memory consumption by volume sets.

One or more predefined memory consumption thresholds can be defined, per volume set or for the entire memory, for detecting a volume set that consumes most or all of its quota. The memory consumption thresholds can be defined as a fraction of the corresponding memory quota, for example: three predefined thresholds assigned for metadata consumption of a specific volume set can be defined as 80%, 90% or 100% of the memory quota of a volume set. The same thresholds can be defined globally for the entire volume sets of storage system 100.

Memory monitor 130 is configured for detecting high levels of memory utilization, by comparing the memory utilized by metadata of volume sets to the predefined assigned threshold(s) and to report volume sets that exceed their assigned threshold(s) to volume manager 140, which determines the memory restrain that should be applied.

Memory restraining, upon detection of a volume set whose metadata exceeds or approaches the corresponding assigned memory quota, can include disabling memory consuming services or reducing the amount of currently consumed memory. The latter may reduce the quality of service.

Upon exceeding a memory consumption threshold, by a volume set, at least one of the following restraining actions can be applied: (i) disabling creation of new snapshots related to the volume set, given that the size of the volume metadata is affected by the creation of new snapshots and/or by subsequent updates made to the data of the snapshots; (ii) disabling updates to snapshots related to the volume set or to volumes in the set that are associated with snapshots; (iii) compressing or paging out cold areas of the metadata (e.g., the mapping data-structure(s)); (iv) if the number of snapshots related to the volume set exceeds a snapshot number threshold, then snapshots related to the volume set can be deleted; (v) executing a defragmentation process or giving priority to a background defragmentation process that reduces the amount of fragments in the metadata related to the volume set. The defragmentation process may include reducing the amount of fragments in the mapping data-structure which decreases the size of the mapping data-structure; (vi) Alerting a user associated with the volume set or an administrator that the memory consumption reached a predefined threshold. The administrator can then increase the memory quota for the volume set or be can add memory to the storage system. The user, upon receiving the alert, can delete data from the volume set, can delete snapshots or execute a defragmentation process.

Several severity levels of memory consumption thresholds can be defined and the restraining action can be selected according to the severity level. For example: for low severity threshold levels (e.g. 75% of the memory quota) the restriction action can be alerting the user or restricting memory consuming services, for example: disabling snapshots creation or any snapshots related updates. For higher severity threshold levels (e.g. 90% of the memory quota), the restriction action can include: (i) reducing the amount of utilized memory, e.g. by compressing or paging out cold areas of the mapping data-structure, which may increase the latency, as metadata access will require reading from the disk; or (ii) suspending any access to the volume until an execution of defragmentation process is completed. The highest severity threshold levels (e.g. 98% of the memory quota) can trigger punitive actions that may involve destructive operations, such as deleting snapshots or complete blocking of write requests.

The selection of the restraining action can be further depended on a classification of the violating volume set. A volume-set class can be defined by the type of the volumes in the set, the size of the volume(s), a class of service assigned for the volume set, etc.

Elements within control layer 103 can be implemented as centralized modules operatively connected to the plurality of storage control devices or can be distributed over a part or all storage control devices. Logical contiguity of successive portions and physical contiguity of the storage location allocated to the portions in the system are not necessarily correlated.

FIG. 1, described above, illustrates a general schematic of the system architecture in accordance with an embodiment of the presently disclosed subject matter. Certain embodiments of the present invention are applicable to the architecture of a computer system described with reference to FIG. 1. However, the invention is not bound by the specific architecture; equivalent and/or modified functionality may be consolidated or divided in another manner and may be implemented in any appropriate combination of software, firmware and hardware. Those versed in the art will readily appreciate that the invention is, likewise, applicable to any computer system and any storage architecture implementing a virtualized storage system. In different embodiments of the invention the functional blocks and/or parts thereof may be placed in a single or in multiple geographical locations (including duplication for high-availability). Connections between different components in illustrated in FIG. 1, may be provided via Wire-line, Wireless, cable, Internet, Intranet, power, satellite or other networks and/or using any appropriate communication standard, system and/or protocol and variants or evolutions thereof (as, by way of unlimited example, Ethernet, iSCSI, Fiber Channel, etc.).

Figure 2:
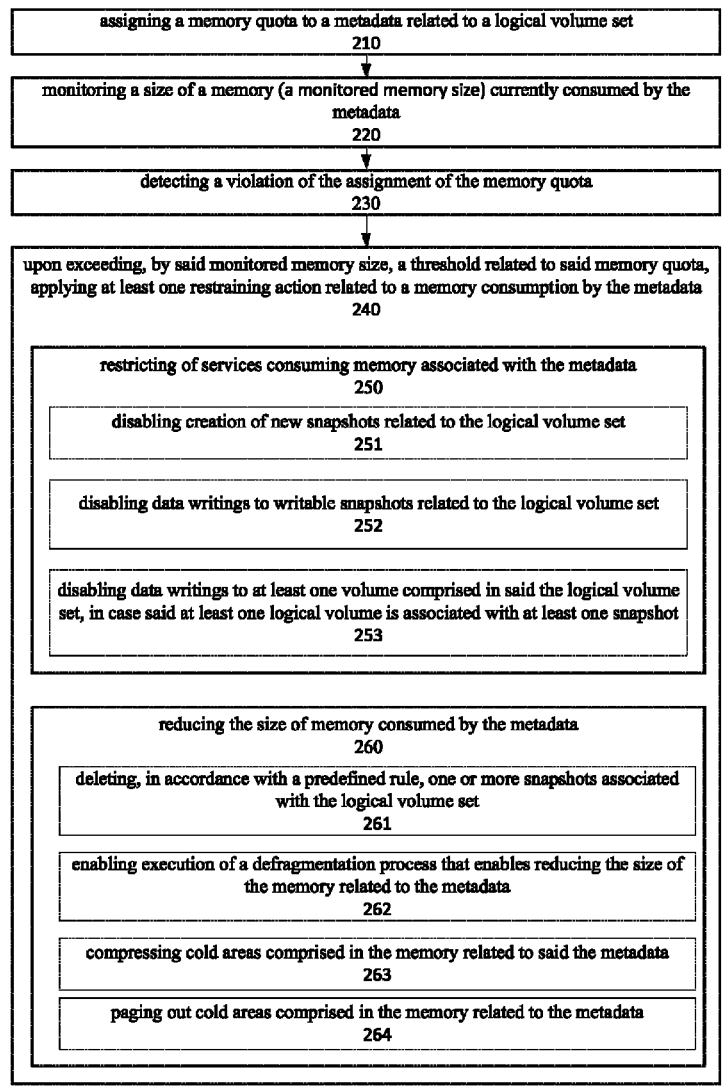
FIG. 2 illustrates a generalized flowchart of a method of monitoring and controlling memory utilization in accordance with certain embodiments of the presently disclosed subject matter.

FIG. 2 illustrates a method 200 of monitoring and controlling memory consumption of volume metadata, according to embodiments of the presently disclosed subject matter.

In accordance with an embodiment of the presently disclosed subject matter, method 200 may include step 210 of assigning a memory quota for a metadata related to a logical volume set in a storage system. The metadata can include a mapping data-structure capable of mapping between virtual storage addresses and physical storage addresses allocated to the logical volume set. The metadata can reside in metadata memory 110.

The value of the memory quota can be configured in accordance with a classification of the volume set. The classification can be, for example: (i) the size of the volume(s) in the set. A large volume is assigned with a larger memory quota than the memory quota of a smaller volume. (ii) a type of the volume(s) in the set. A type can be the provisioning technique of the volumes (e.g. thin or thick provisioning). A thick provisioned volume can gain a higher priority and therefore is assigned with a larger memory quota than the memory quota of a thin provisioned volume; (iii) A class of service (e.g. high, medium, low, gold, silver, bronze, etc.) assigned to the volume set or a quality of service guaranteed to an owner entity (e.g. a user or application) of the volume set.

Step 210 can be executed by volume manager 140.

Step 210 is followed by a step 220 of monitoring a size of a memory ("monitored memory size") consumed by the metadata. The monitoring can be performed constantly or periodically and includes techniques known in the art for evaluating (e.g. measuring, calculating, obtaining or keeping track of) the size of a data structure and more specifically, of a dynamic data structure. In case the metadata utilizes more than one data structure (for example, in case there are more than one logical volume included in the logical volume set, and each volume employs a separate data structure), the evaluated sizes of all the data structures, that composes the metadata related to the volume set, are summed, so as to construct the "monitored memory size".

Step 220 is followed by a step 230 of detecting a violation of the assignment of the memory quota. The violation may involve exceeding a predefined threshold that is a function of the memory quota. For example: the predefined threshold can be a fraction of the memory quota, e.g. 80% of the memory quota or the whole memory quota. More than one threshold can be assigned to the memory consumption by the metadata, each threshold is associated with a respective severity level (e.g. low, medium, high, critical).

Steps 220 and 230 can be performed by memory monitor 130.

Step 230 is followed by a step 240 of applying at least one restraining action related to a memory consumption by the metadata, upon exceeding, by the monitored memory size, the threshold (or one of the thresholds) related to the memory quota. The restraining action is selected from: (i) actions related to restriction of memory consuming services in regard with the volume set, e.g. disabling all or part of such services; (ii) actions related to reducing the size of memory consumed by the metadata, e.g. destructive actions for freeing part of the space of the metadata; and (iii) alerting a user. The actions related to restriction of memory consuming services can include: disabling creation of new snapshots related to the logical volume set; disabling data writings to writable snapshots related to the logical volume set; and disabling data writings to at least one volume included in the logical volume set, in case the at least one logical volume is associated with at least one snapshot. The actions related to reducing the size of memory consumed by the metadata can include: deleting one or more snapshots associated with the logical volume set; enabling execution of a defragmentation process that enables reducing the size of the memory related to the metadata; compressing cold areas included in the memory related to the metadata; and paging out cold areas included in the memory related to the metadata.

The applied restraining action(s) can be selected from multiple restraining actions, in accordance with the severity level of the threshold that has just been exceeded. i.e. a volume set whose metadata memory has exceeded a threshold having a higher level of severity is be applied with more destructive restraining action than a volume set whose metadata memory has exceeded a threshold having a lower level of severity. For example: if the current memory utilization is 80% of the quota, the restraining action can include restricting memory consuming services, for example: disabling creation of new snapshots, disabling writing to snapshots or disabling writing to volumes that have snapshots; if the memory utilization is 90% of the quota, the restraining action includes performing processes for reducing the amount of utilized memory, for example: compressing or paging out cold areas of the mapping data-structure, execute a defragmentation process that reduces the amount of fragments in the volume(s) associated with the metadata and deleting snapshots according to certain criteria, for example: deleting oldest snapshots, newest snapshots or the largest snapshots. These actions may reduce the quality of service.

The applied restraining action(s) can be alternatively or additionally selected from the multiple restraining actions, in accordance with the classification of the volume set. For example: higher classified volume sets (e.g. thick provisioned volumes, "gold" class of service) can be applied with less destructive restraining actions than lower classified volume sets (e.g. thin provisioned volumes, "bronze" class of service).

Method 200 can be performed for selected volume sets or for all logical volume sets configured in the storage system.

Figure 3:
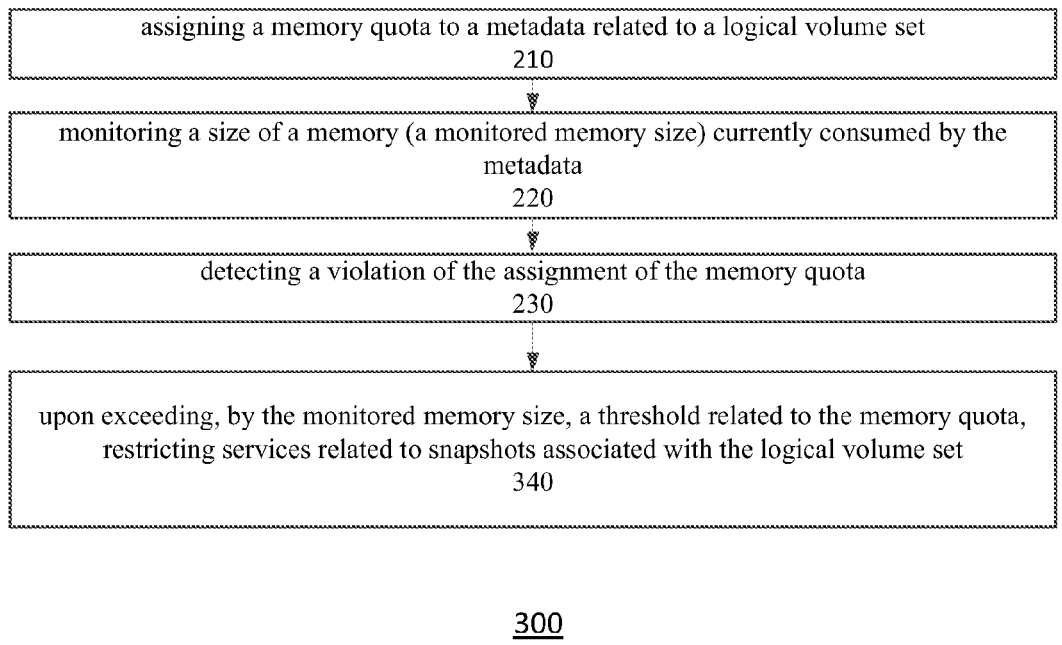
FIG. 3 illustrates a generalized flowchart of a method of monitoring and controlling memory utilization in accordance with other embodiments of the presently disclosed subject matter.

FIG. 3 illustrates a method 300 for monitoring and controlling memory consumption of volume metadata, according to other embodiments of the presently disclosed subject matter.

Method 300 includes steps 210-230 as in method 200. Step 230 is followed by step 380 of restricting services related to snapshots associated with the logical volume set. The services related to snapshots associated with the logical volume set can include, for example: creating snapshots, writing, to snapshots, writing to volumes associated with snapshots or any other snapshot operation that may cause augmentation of the metadata space. The restricting can include for example disabling the services or denying all or part of the service requests. The restriction of services related to snapshots can be applied in addition to other restraining actions applied according to step 240 of method 200.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

The invention claimed is:

1. A method of managing metadata for managing a logical volume set out of multiple logical volume sets configured in a storage system, the method comprising:
   a. monitoring by a memory monitor of the storage system a size of the metadata, the logical volume set comprises at least one logical volume and at least one snapshot; and
   b. upon detecting that said size of the metadata has exceeded a threshold related to a memory quota assigned to said metadata, restraining by a volume manager of the storage system at least one service related to data stored in the logical volume set and affects said size of said metadata.

2. The method of claim 1, wherein the method is provided for all logical volume sets configured in the storage system.

3. The method of claim 1, wherein said metadata comprises a data-structure capable of mapping between virtual storage addresses and physical storage addresses allocated to said logical volume set.

4. The method of claim 1, wherein said logical volume set includes a plurality of logical volumes associated with a specific owner entity.

5. The method of claim 1 comprising assigning said memory quota in accordance with a quality of service guaranteed to an owner entity of said logical volume set.

6. The method of claim 1 comprising assigning the memory quota to said metadata in accordance with at least one aspect selected from: a type of volume provisioning technique applied on said logical volume set and a class of service assigned to said logical volume set.

7. The method of claim 1, wherein said at least one service is selected among services in accordance with a classification of said logical volume set.

8. The method of claim 1, wherein one or more thresholds related to said memory quota are characterized by respective severity levels, and wherein said at least one service is selected among services, in accordance with a severity level of a threshold out of the one or more thresholds related to said memory quota that is being exceeded.

9. The method of claim 1 further comprising
applying at least one action related to reducing the size of said metadata when detecting that the size of said metadata has exceeded a second threshold.

10. The method of claim 1 wherein said at least one service being restrained is selected from a group consisting of:
 a. creation of new snapshots related to said logical volume set;
 b. data writings to writable snapshots related to said logical volume set; and
 c. data writings to the at least one volume comprised in said logical volume set, in case said at least one logical volume is associated with at least one snapshot.

11. The method of claim 9, wherein said at least one action is selected from a group consisting of:
 a. deleting one or more snapshots associated with said logical volume set;
 b. enabling execution of a defragmentation process that enables reducing the size of said metadata;
 c. compressing cold areas related to said metadata; and
 d. paging out cold areas related to said metadata.

12. A method of managing metadata for managing a logical volume set out of logical volume sets configured in the storage system, the method comprising:
 a. monitoring by a memory monitor of the storage system a size of the metadata, wherein the logical volume set comprises at least one logical volume and at least one snapshot; and
 b. upon detecting that said size of said metadata has exceeded a threshold related to a memory quota assigned to said metadata, restricting by a volume manager of the storage system services related to snapshots associated with said logical volume set.

13. A storage system, comprising:
 a metadata memory for storing a metadata related to a logical volume set configured in the storage system, the logical volume set comprises at least one logical volume and at least one snapshot;
 a memory monitor, operatively coupled to said metadata memory, configured to monitor a size of said metadata and to detect that said size of said metadata has exceeded a threshold related to a memory quota assigned to said metadata; and
 a volume manager, operatively coupled to said metadata memory and said memory monitor, the volume manager is configured to restrain at least one service related to data stored in the logical volume set and affects said size of said metadata, upon exceeding the threshold.

14. The storage system of claim 13, wherein said metadata comprises a data-structure capable of mapping between virtual storage addresses and physical storage addresses allocated to said logical volume set.

15. The storage system of claim 13, wherein the volume manager is configured to assign said memory quota in accordance with a quality of service guaranteed to an owner entity of said logical volume set.

16. The storage system of claim 13, wherein said at least one service is selected among services, in accordance with a classification of said logical volume set.

17. The storage system of claim 13, wherein one or more thresholds related to said memory quota are characterized by respective severity levels, and wherein said at least one service is selected among services in accordance with a severity level of a threshold out of the one or more thresholds that is being exceeded.

18. The storage system of claim 13, wherein said at least one service being restrained is selected from a group consisting of:
 a. creation of new snapshots related to said logical volume set;
 b. data writings to writable snapshots related to said logical volume set; and
 c. data writings to the at least one volume comprised in said logical volume set, in case said at least one logical volume is associated with at least one snapshot.

19. The storage system of claim 13, wherein said volume manager is configured to apply at least one action related to reducing the size of said metadata when detecting that the size has exceeded a second threshold, wherein the at least one action is selected from a group consisting of:
 a. deleting, in accordance with a predefined rule, one or more snapshots associated with said logical volume set; and
 b. enabling execution of a defragmentation process that enables reducing the size of said metadata.

20. A non-transitory computer readable storage medium, that stores program instructions that when executed by a computer, cause the computer to perform:
 a. monitoring a size of metadata for managing a logical volume set, the logical volume set comprises at least one logical volume and at least one snapshot; and
 b. upon detecting that said size has exceeded a threshold related to a memory quota assigned to said metadata, restraining at least one service related to data stored in the logical volume set and affects said size of said metadata.

* * * * *